Feb. 12, 1929.   1,702,213
L. KIRAL
MOVING PICTURE PROJECTING MACHINE
Filed Dec. 19, 1927   2 Sheets-Sheet 1

LUKE KIRAL.
INVENTOR
BY Victor J. Evans
ATTORNEY

WITNESS:

Feb. 12, 1929. 1,702,213
L. KIRAL
MOVING PICTURE PROJECTING MACHINE
Filed Dec. 19, 1927 2 Sheets-Sheet 2
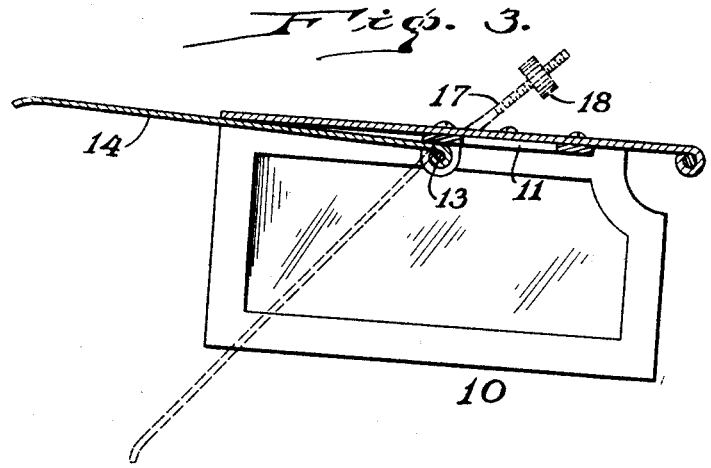
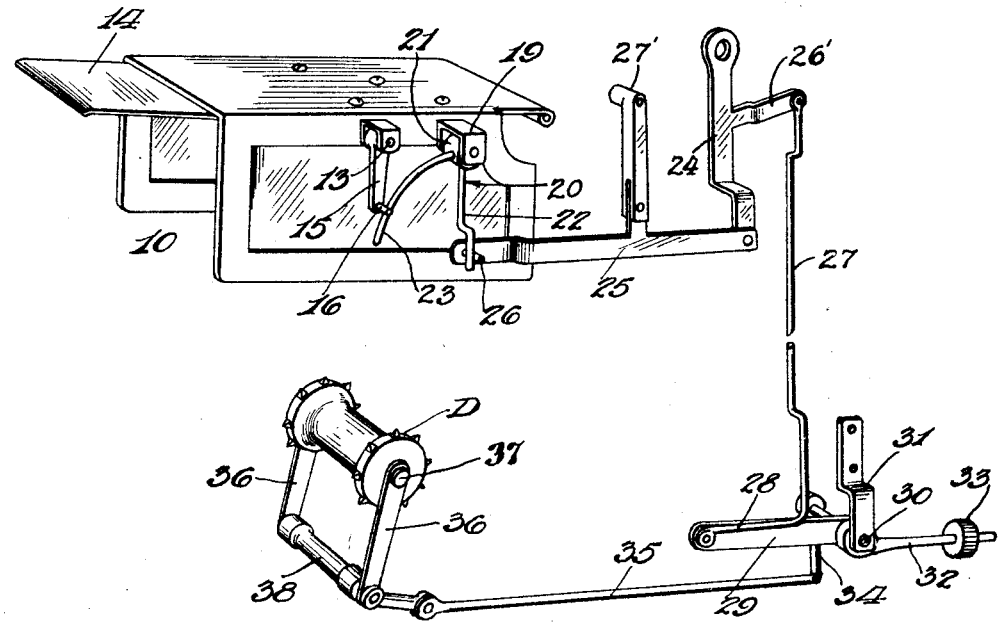
LUKE KIRAL.
INVENTOR Patented Feb. 12, 1929.

1,702,213

UNITED STATES PATENT OFFICE.

LUKE KIRAL, OF BROOKLYN, NEW YORK.

MOVING-PICTURE-PROJECTING MACHINE.

Application filed December 19, 1927. Serial No. 241,165.

This invention relates to moving picture projecting machines and is an improvement over the invention shown and described in my prior U. S. Letters-Patent No. 1,565,163, dated December 8th, 1925.

The primary object of this invention resides in a means for automatically controlling the opening of the shutter of a moving picture projecting machine by the action of the film strip when threaded into the machine and during its passage therethrough, and by which the shutter automatically closes in the event that the film should accidentally become broken for preventing the light beam from igniting the film.

Another object of the invention is to control the actuation of the shutter of a moving picture projecting machine by the tension of the film strip, in lieu of by the speed of the machine as is the usual practice.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 3 is an enlarged detail vertical sectional view on the line 3—3 of Figure 2.

Figure 5 is a perspective view of my invention per se.

Figure 1:
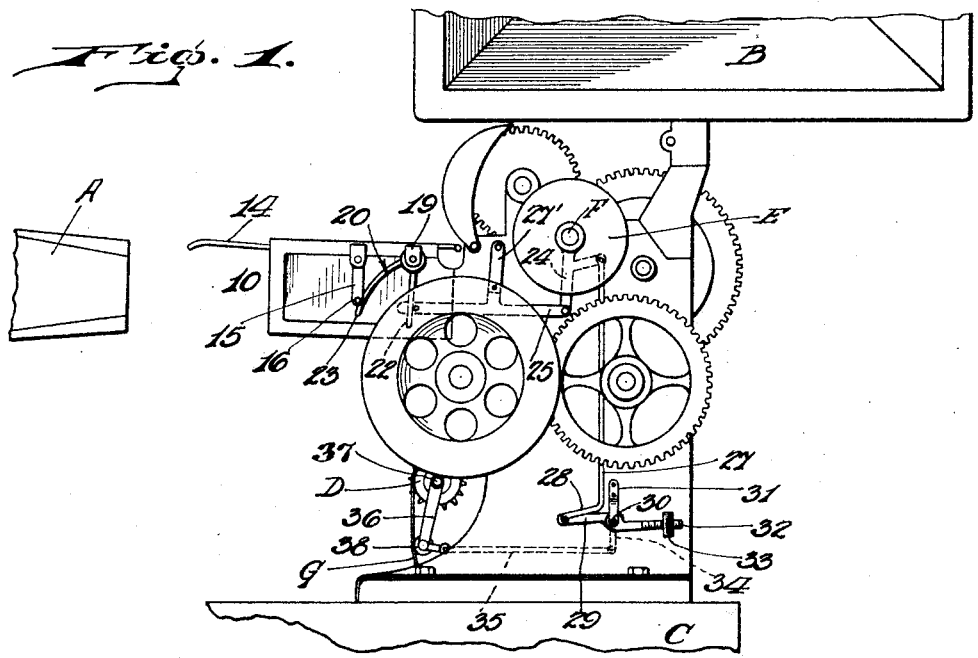
Figure 1 is a fragmentary side elevational view of a moving picture projecting machine with my invention applied thereto.
Figures 2, 4:
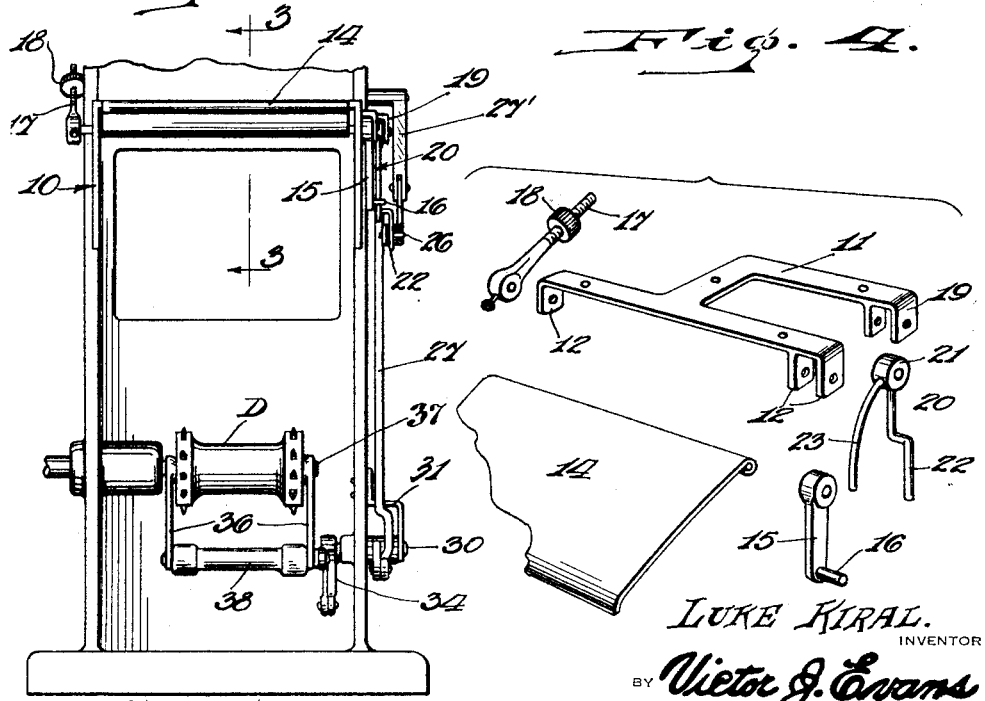
Figure 2 is an end elevation looking in the direction of the shutter.
Figure 4 is a collective perspective view of the shutter mechanism in a separated condition.

Referring to the drawings by reference characters, the letter A designates a portion of the lamp housing of a moving picture projecting machine, B the upper film magazine, C the lower film magazine in which the film is wound after passing from the magazine B across the usual film opening. The take-up sprocket B is positioned between the two magazines for feeding the film from one magazine to the other and which holds the film taut as it passes the film opening. E is the friction clutch wheel mounted on the driving shaft F and which shaft is rotated by the usual driving gears.

The reference numeral 10 designates the shutter housing which is open throughout its length for the passage of the light beam and in which a bracket 11 is mounted. The bracket is provided with opposed ears 12 which serve as a bearing for the pivot pin 13 on which the shutter 14 is fixedly mounted. The shutter is contained within the housing while the pivot pin 13 extends beyond the sides thereof, one end of which has a downwardly extending arm 15 fixed thereon with a pin 16 extending outward from the free end thereof, while the opposite end of the pivot pin has an arm 17 fixed thereto with an adjustable counter-balance weight 18 for counter-balancing the weight of the shutter to enable the shutter to be lifted by a slight force imparted thereto by the shutter actuating means hereinafter to be fully described. A set of ears 19 are also carried by the bracket and extend onto the outside of the housing and serve as a bearing for a shutter lifting member 20. The member 20 includes a hub 21 having a straight downwardly extending arm 22 provided with an offset portion, and a curved arm 23 which is in a plane to engage the pin 16 of the arm 15.

Loosely mounted on the driving shaft F is a lever 24 to which an arm 25 is pivotally connected and which extends in the direction toward the shutter actuating member 20. A pin 26 extends from the free end of the arm 25 in the path of the offset end of the arm 22 for engaging the same to move the shutter to a raised position. A hanger arm 27' is pivotally mounted to the casing of the machine and has its depending end pivoted to the arm 25 for supporting the arm on a substantially horizontal plane.

Extending outward from the lever 24 is a branch arm 26' to which the top end of a link 27 is pivotally connected. The lower end of the link is bent at right angle to provide an angular arm 28 which is pivoted to the outer free end of a rocker arm 29 fixed to a rock shaft 30 journaled in the machine frame and in a bracket 31 mounted thereon. The rocker arm 29 has an oppositely extending arm 32 integral therewith on which a counter-balance weight 33 is adjustably mounted. The inner end of the rocker shaft carries a depending arm 34 to which one end of a link 35 is pivotally connected. The other end of a link 35 is pivotally connected to an angular arm of one of a pair of bearing arms 36 pivotally mounted on the shaft 37 on which the take-up sprocket D is mounted and which arms serve as a swingable bearing for a guide roller 38 over which the film strip passes.

In practice, the film G is threaded into the machine in the usual manner and passes over the take-up sprocket D and roller 38 and as the machine gradually picks up in speed the tension of the film strip between the sprocket and the winding spool causes the roller 38 and its arms to swing downward against the action of the counter-weight 33 as shown in Figure 1 of the drawings. The downward movement of the roller imparts an upward movemet to the rocker arm 29 which in turn lowers the link 27 causing the lever 24 to swing in the direction toward the shutter housing which moves the arm 25 causing the pin 26 to push against the arm 22 which causes the curved arm 23 to push against the pin 16 of the arm 15 and in turn swing the shutter to a raised position as shown in full lines in the drawings to allow the light beam from the lamp housing to pass through the shutter housing. In the event that the film strip should break, the tension thereon is of course released, whereupon the shutter will drop by gravity to the position shown in dotted lines and accordingly return the operating parts to normal position. When the shutter is closed the light beam is shut off from the film strip to prevent the intense heat of the same from igniting the film. It will be appreciated that this invention differs from my prior patent in that the shutting off of the shutter is controlled by the tension of the film strip and that the operating parts are in no way dependent upon the friction or clutch wheel E.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a moving picture projecting machine, a pivoted shutter, a counter-balance weight attached to said shutter, an arm carried by said shutter, a pivoted actuating member movable into the path of said arm, a pivoted lever carrying an arm engageable with said actuating member, a rocker arm, a link pivotally connected to said lever and to one end of said rocker arm, a counter-balance weight carried by the other end of said rocker arm, a swingable guide roller over which a film strip is adapted to pass, and a link operatively connected to said guide roller and to said rocker arm, substantially as and for the purpose specified.

2. In a moving picture projecting machine, a pivoted shutter, an arm carried by said shutter, a pivoted actuated member movable into the path of said arm, a pivoted lever having an arm engageable with said actuating member, a rocker arm, a link pivotally connected to said lever and to one end of said rocker arm, a swingable guide roller over which a film strip is adapted to pass and a link operatively connected to said guide roller and to said rocker arm, substantially as and for the purpose specified.

In testimony whereof I have affixed my signature.

LUKE KIRAL.